United States Patent
Aumann et al.

(10) Patent No.: US 11,931,948 B2
(45) Date of Patent: Mar. 19, 2024

(54) DEVICE AND METHOD FOR THERMOSETTING A KNITTED FABRIC

(71) Applicant: Bayerische Motoren Werke Aktiengesellschaft, Munich (DE)

(72) Inventors: Thomas Aumann, Buch am Erlbach (DE); Florian Dechant, Adlkofen (DE); Johann Gasslhuber, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1245 days.

(21) Appl. No.: 16/526,619

(22) Filed: Jul. 30, 2019

(65) Prior Publication Data

US 2020/0040502 A1     Feb. 6, 2020

(30) Foreign Application Priority Data

Jul. 31, 2018    (DE) .................... 10 2018 212 743.3

(51) Int. Cl.
  *B29C 51/00*     (2006.01)
  *B29C 70/46*     (2006.01)
  *D06C 7/02*      (2006.01)

(52) U.S. Cl.
  CPC ............ *B29C 51/004* (2013.01); *B29C 70/46* (2013.01); *D06C 7/02* (2013.01)

(58) Field of Classification Search
  CPC ....... B29C 51/004; B29C 70/46; B29C 51/18; B29C 51/20; B29C 51/266; B29C 51/421; B29C 51/424; B29C 51/427; D06C 7/02
  USPC ........ 425/383, 384, 394, 395; 264/239, 241, 264/257, 299, 313, 316, 319, 320, 322, 264/325, 330, 331.11
  See application file for complete search history.

(56) References Cited

U.S. PATENT DOCUMENTS 1,682,870 A     9/1928 Heusen
4,287,143 A *   9/1981 Sears, Jr. .................. B32B 5/24
                                              264/327

(Continued)

FOREIGN PATENT DOCUMENTS

DE            362944 C      12/1922
DE       1 928 946 A1        4/1970

(Continued)

OTHER PUBLICATIONS

German Search Report issued in German counterpart application No. 10 2018 212 743.3 dated May 9, 2019, with Statement of Relevancy (Seven (7) pages).

(Continued)

*Primary Examiner* — Philip C Tucker
*Assistant Examiner* — Brian R Slawski
(74) *Attorney, Agent, or Firm* — Crowell & Moring LLP

(57) ABSTRACT

A device for thermosetting a knitted fabric includes a first tool half and a second tool half. The first tool half and the second tool half in a closed position enclose a cavity in which the knitted fabric is receivable. Each of the first tool half and the second tool half have a respective shape-imparting effective surface by way of which an external form of the knitted fabric is determinable. The device further includes a heating installation where thermal energy is introducible into the knitted fabric via the heating installation.

11 Claims, 1 Drawing Sheet

(56) References Cited

U.S. PATENT DOCUMENTS

| | | | | |
|---|---|---|---|---|
| 4,570,461 | A * | 2/1986 | Sawazaki | D04B 1/02 |
| | | | | 66/194 |
| 5,441,675 | A * | 8/1995 | Souders | B29C 33/3814 |
| | | | | 264/402 |
| 5,468,433 | A * | 11/1995 | Perry | B29C 44/146 |
| | | | | 264/46.4 |
| 6,401,496 | B1 * | 6/2002 | Roell | D04B 1/22 |
| | | | | 66/170 |
| 8,673,106 | B1 * | 3/2014 | Jolley | B29C 43/10 |
| | | | | 156/286 |
| 2004/0262816 | A1 | 12/2004 | Parks et al. | |
| 2015/0211154 | A1 * | 7/2015 | Hightower, III | D02G 1/0286 |
| | | | | 428/221 |
| 2017/0233916 | A1 | 8/2017 | Pyun | |

FOREIGN PATENT DOCUMENTS

| | | |
|---|---|---|
| EP | 0 385 543 A1 | 9/1990 |
| JP | 02067111 A * | 3/1990 |
| JP | 7-60721 A | 3/1995 |
| JP | 8-13326 A | 1/1996 |
| JP | 8-187161 A | 7/1996 |
| JP | 2010-158831 A | 7/2010 |
| JP | 2012-224016 A | 11/2012 |
| TW | 200708639 A | 3/2007 |

OTHER PUBLICATIONS

Chinese Office Action issued in Chinese application No. 201910679407.4 dated Dec. 23, 2022, with English translation (Twenty (20) pages).

* cited by examiner

DEVICE AND METHOD FOR THERMOSETTING A KNITTED FABRIC

CROSS REFERENCE TO RELATED APPLICATION

This application claims priority under 35 U.S.C. § 119 from German Patent Application No. 10 2018 212 743.3, filed Jul. 31, 2018, the entire disclosure of which is herein expressly incorporated by reference.

BACKGROUND AND SUMMARY OF THE INVENTION

The present invention relates to a device and to a method for thermosetting a knitted fabric.

In the present-day construction of vehicles, surfaces in the vehicle interior or in the passenger cabin of motor vehicles, respectively, are provided with decorations in order for an appealing visual impression to be generated for the vehicle passenger. It has been established herein that decorations are adhesively bonded to a plastics material carrier, the decorations potentially being present in the form of films having the visual impact of wood or carbon, for example. Moreover, it is also known for skins from leather or artificial leather to be assembled on carrier structures with the aid of press-laminating methods in order for a visual impact of leather to be generated. There is furthermore also the possibility for textiles, especially also knitted fabrics, to be used as surface material.

However, before the surface textiles are applied to the carrier structure, the textiles are subjected to a production process. The textile knitted fabric herein is first generated from one or a plurality of yarns in a knitting process. The yarns are oiled on the surfaces thereof so that the yarns can better slide on the guiding installations of the knitting device. After the knitting process, the yarns have to be washed in order for the oil to be removed from the knitted fabric. The textile materials are distorted or creased, respectively, in the washing process. In order for the textiles to be restored to a desired shape the textiles have to be thermoset after the washing. In thermosetting the textile knitted fabrics are heated to the extent that desired thermal reactions are triggered while the textiles are simultaneously brought to the desired shape. In the prior art of the apparel industry, 3D knitted fabrics are finished and thermoset in an autoclave. However, the use of an autoclave for the thermosetting of textile knitted fabrics is associated with significant disadvantages for applications in the automotive sector.

Proceeding from this prior art, the present invention is based on the object of specifying a method by way of which the disadvantages of the prior art are overcome. It is a particular object of the invention to specify a method by way of which particularly short cycle times are capable of being implemented.

The invention provides a device for thermosetting a knitted fabric, having a first tool half and a second tool half which in a closed position enclose a cavity, wherein a knitted fabric is receivable in the cavity. Each tool half can in each case have a shape-imparting effective surface by way of which the external form of the knitted fabric is determinable. When the knitted fabric is applied to the effective surface, the external shape of the knitted fabric follows the shape of the tool surface, on account of which the external shape of the knitted fabric is determined by the shape of the tool surface. Furthermore, a heating installation by way of which the thermal energy is capable of being introduced into the knitted fabric can be provided. The device advantageously unifies the advantages of 3D modeling of the knitted fabrics by way of the two tool halves which in a contacting manner bear on both sides of the knitted fabrics and function in a manner similar to a press-laminating tool, with the advantages of the thermosetting process. The use of a two-part tool offers the advantage that planar 3D knitted fabrics are brought into shape, wherein a very great freedom in terms of the geometric design of the shape exists. Moreover, 3D knitted fabrics can be thermoset so as to follow a shape by way of the device. In principle, a differentiation is made between two-dimensional (2D) and three-dimensional (3D) knitted fabrics. 2D and 3D knitted fabrics are both generated on a flat-bed knitting machine. In the case of 2D knitted fabrics, a cloth having a consistent width is generated with the aid of a knitting machine and rolled up as web material. Individual blanks are later cut from the web material. By contrast thereto, individual parts which already have the finished blank contour are made when generating 3D knitted fabrics. Further trimming is not necessary.

Furthermore, the heating installation can be configured as a temperature-controllable medium, wherein at least one of the two tool halves has infeed ducts by way of which the temperature-controllable medium is capable of being introduced into the knitted fabric. On account of the small size of the cavity to be impinged with steam in comparison to an autoclave, substantially smaller quantities of the temperature-controllable medium are required.

At least one of the two tool halves can have discharge ducts by way of which the temperature-controllable medium is capable of being discharged from the knitted fabric. This guarantees a controllable flow through the knitted fabric.

Air, in particular hot air, and/or steam, in particular hot steam, can be used as the temperature-controllable medium. The open pore characteristic of the textile surface can be utilized in a particularly simple manner, and thermal energy can be introduced into the textile knitted structure in a particularly positive manner, on account of the use of the media.

In an alternative embodiment of the device the heating installation can be configured as a radiator array, in particular as infrared radiators or as electric radiators.

Furthermore, a compressible intermediate tier can be introduced between an effective surface of a tool half and a surface of the knitted fabric. Distortion of the knitted fabric by compression and the generation of shiny spots in the knitted fabric can be avoided by inserting a soft intermediate tier onto the visible side of the decoration. An additional flexible or soft or compressible, respectively, intermediate tier can thus also be introduced in the upper and/or the lower tool half, the intermediate tier being in particular configured as a cloth, a gel cloth, a silicone die, etc. On the one hand, this offers the advantage that the (thermoset) knitted fabric to be processed is treated gently on the visible surface, and on the other hand the advantage that more contact pressure can be generated in the case of a closed cavity without the knitted fabric potentially being damaged. Soft/compressible/flexible in this context means that the intermediate tier is softer than the knitted fabric such that the intermediate tier in the case of compression is elastically deformed before the knitted fabric is imparted any elastic deformation.

A method according to one of the preceding claims, characterized in that the knitted fabric is provided with eyelets knitted thereinto. This offers the advantage that the knitted fabric with the aid of the eyelets can be accurately positioned in a locationally fixed manner in the tool in that the eyelets are pre-positioned on fixing pins in the tool.

In another aspect, the invention relates to a method for thermosetting a knitted fabric, the method comprising the following steps:

disposing the knitted fabric on an effective surface of a tool half, impinging the knitted fabric by way of temperature, closing the tool, wherein a cavity in which the knitted fabric is disposed is generated between the first tool half and the second tool half, and demolding the knitted fabric from the tool half.

The method unifies the advantages of 3D modeling by way of the two tool halves which on the knitted fabric lie on top of one another and function in a manner similar to a press-laminating tool with the advantages of thermosetting.

The knitted fabric can first be impinged by way of temperature, wherein the tool is closed only thereafter such that the knitted fabric is calibrated between the tool halves. The knitted fabric thus substantially maintains the external form thereof, or the external dimensions thereof, respectively. According to an alternative method variant the tool, upon disposing the knitted fabric and prior to impinging by way of temperature, can be closed and opened again. Pre-calibrating of the knitted fabric can thus be achieved in a particularly simple manner, wherein creases and similar warped features which on account of the pressing of the knitted fabric between the tool halves are situated on the surface of the knitted fabric are straightened out. According to this method variant, the knitted fabric can be impinged by way of temperature and thereafter the tool can be closed again. The knitted fabric is thus first advantageously pre-calibrated, then impinged by way of temperature, and thereafter calibrated in the case of a yet again closed tool. According to this method variant, the knitted fabric is pinned to, or disposed on, the effective surface, respectively. Thereafter the tool halves are converged, and the knitted fabric is pre-calibrated. The tool is subsequently opened, and the knitted fabric is heated by being impinged by way of temperature, wherein the melt yarn melts. Thereafter, the tool is closed yet again, and the knitted fabric is finally calibrated.

Alternatively thereto, the knitted fabric is impinged by way of temperature contemporaneously while being calibrated. The cycle time of the overall process is further reduced on account thereof.

The knitted fabric is passed by a flow of a temperature-controlled medium, in particular of air or steam, during the thermosetting method.

The choice of the temperature level for the medium depends on a multiplicity of factors. The temperature has to be selected so as to depend on the geometry, the installation location, and/or the installation position of the finished component. However, the melting properties of the hot-melt adhesive yarn and the temperature resistance of the primary yarn also play an important part in the selection of the temperature. In the case of components which in the installed state are exposed to comparatively high temperatures, for example on account of direct solar radiation as is the case with instrument panels, a hot-melt adhesive yarn which complies with the climatic requirements has to be used. Experiments have shown that the medium herein can have a temperature in the range from 140° C. to 170° C., preferably in the range from 150° C. to 160° C. In the case of components which are subjected to less thermal stress and are installed in the foot well of a motor vehicle, for example, materials that melt at a lower temperature in the range from 90° C. to 120° C. can optionally be used.

Furthermore, the knitted fabric can be actively cooled once the knitted fabric has reached a predetermined temperature. The knitted fabric can thus advantageously be kept in shape, and the process time can be further reduced.

A temperature-controlled medium for cooling the knitted fabric can be introduced into the cavity by way of infeed ducts. The latter can be the same infeed ducts as for the medium for heating the knitted fabric, or separate infeed ducts. Alternatively thereto, the infeed ducts by way of which the temperature-controlled medium for heating the knitted fabric has been directed into the knitted fabric can be utilized as discharge ducts. To this end, a suction system is connected to the infeed ducts, and the warm medium, now in the reversed flow direction, is suctioned from the knitted fabric by a vacuum through the infeed ducts. Ambient air is then suctioned into the knitted fabric by way of a tool gap, and the knitted fabric is cooled on account thereof. In order to ensure the feeding of the ambient air into the knitted fabric, nozzles or additional infeed ducts can be additionally provided in the tool halves.

In a further aspect the invention also relates to a method for producing a knitted fabric, the method comprising the following steps:

generating a knitted fabric, in particular a 3D knitted fabric, and cleaning the knitted fabric, in particular by washing in a liquid, characterized by the step of thermosetting the knitted fabric by a method according to the invention.

The process of thermosetting, if and when required, can be performed directly upstream of a laminating process in the mass production of automobiles and thus enables an in-line process starting with the production of the knitted fabric, by way of the finishing, i.e., cleaning and thermosetting, of the latter, up to the fastening to a carrier structure.

The use of knitted fabric materials having functional properties offers specific advantages. Knitted fabric materials having anti-soiling properties, having hydrophobic functions, anti-static properties, anti-bacterial properties can in particular be used. Moreover, materials that act in an electrostatically shielding manner, materials that act in a fluorescent manner, materials that bind, and/or degrade, absorb and/or adsorb emissions, materials that heat or integrate light, can also be used.

The advantages of the device that have been described above also apply without limitation to the method described, and vice versa.

The invention is to be explained in more detail hereunder by means of the description of the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
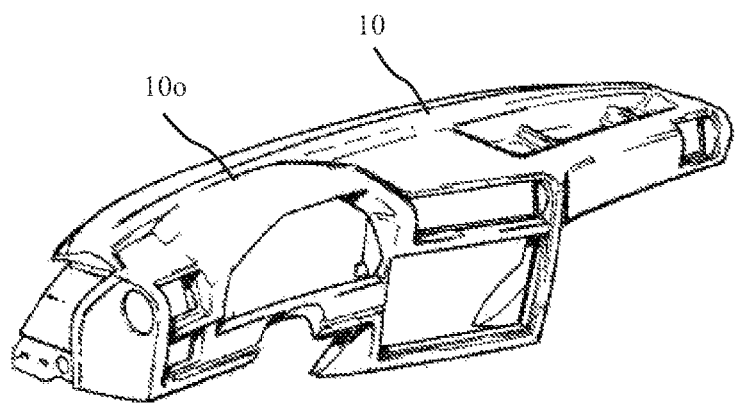
FIG. 1 in an exemplary manner shows a carrier structure.

FIG. 1 shows in an exemplary manner an instrument panel support 10 which is to serve as the carrier structure 10 in order for the method to be explained. Alternatively to the I-panel support illustrated, all of the cladding parts found in the vehicle interior such as glove boxes, central arm rests, visors, arm rests in the door trim, roof liners, etc., can also serve as a carrier structure 10. The instrument panel support 10 has a surface 10o which is to be laminated with the aid of a textile surface structure. As illustrated in FIG. 1, the surface can relate to only a portion such as, for example, the upper surface of the binnacle of the so-called combination instrument. The surface 10o to be laminated can however also be that part of the surface of the carrier structure 10 that would be visible to a vehicle occupant in the interior of the vehicle. Furthermore alternatively, the surface 10o can also comprise the entire surface of the carrier structure 10, wherein in this instance regions of the carrier structure 10 that are not visible to a vehicle occupant would be laminated.

Figure 2:
FIG. 2 shows a knitted fabric in the non-shaped state.
Figure 3:
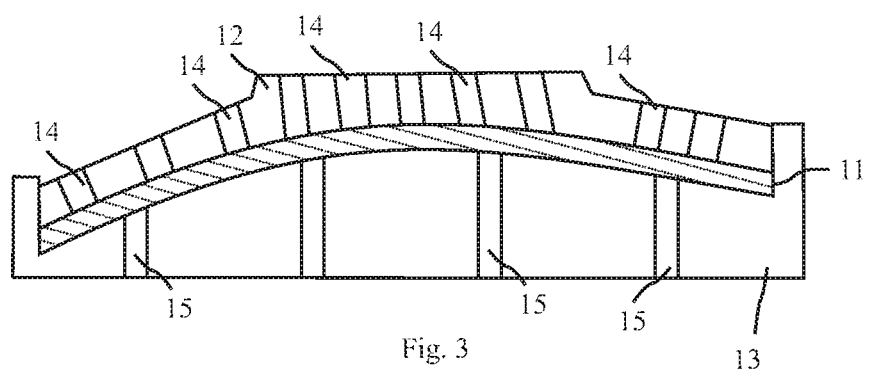
FIG. 3 shows a thermosetting tool having a knitted fabric disposed therein.

A lateral view of a knitted fabric 11, or of a textile material, respectively, is shown in FIG. 2. The knitted fabric 11, or textile material, respectively, in an exemplary manner is illustrated as a two-dimensional, i.e., flat, web material in a state after the washing of the knitted fabric. Alternatively thereto, the knitted fabric 11 can also be pre-shaped in a three-dimensional manner or be creased.

The knitted fabric from FIG. 2 is introduced into a calibration tool which is configured from tool halves 12, 13. The two tool halves 12, 13 conjointly enclose a defined cavity. The knitted fabric 11 is first placed onto the lower tool half 13 and hereby is pulled to the desired shaped. The tool is subsequently closed and the knitted fabric 11 situated therein is brought to a desired temperature. An upper tool half 12, illustrated here as a press ram 12, is applied to the textile knitted structure 11 and the latter is pressed or kept in a desired shape, respectively, on account thereof. The effective face of the upper tool half 12 in this closed position of the tool presses the textile knitted structure 11 against an effective surface of the lower tool half 13. A surface of the textile knitted structure 11 that faces the tool half 12 herein comes into physical contact with the effective face such that the effective face is shape-imparting to the textile knitted structure 11.

In order for the knitted fabric 11 to be temperature controlled, hot air is blown into the cavity by way of infeed ducts 14 which are configured, for example, as nozzle bores in the upper tool half 12, and the knitted fabric material is heated to the desired temperature. Instead of hot air, hot steam from a hot-steam generator can also be introduced into the closed tool and the material be heated to the desired temperature. The hot steam has a positive effect on the required thermosetting reactions in the textile. The knitted fabric herein is configured from one or a plurality of yarns which are knitted in a three-dimensional manner. Each of the yarns is configured from a plurality of filaments, wherein at least one of the filament is configured from a plastics material which is capable of melting and which, when impinged by way of temperature, is capable of being transformed to a viscous or doughy state, respectively. The knitted fabric 11 when thermosetting is thus transformed to a desired external shape. The knitted fabric 11 is subsequently impinged by way of the temperature-controlled medium. The filament capable of melting, also referred to as hot-melt adhesive yarn, is fused herein and connected to neighboring filaments of the yarn or else to other yarns. Alternatively to the hot-melt adhesive yarn, other materials such as, for example, fusible films, materials capable of adhesive bonding, and solutions such as acrylate, can also be used for thermosetting the primary yarn. Once the temperature in the knitted fabric is lowered, the material of the yarn originally capable of melting solidifies and thus sets the surrounding filaments such that the knitted fabric memorizes this shape. The knitted fabric after the thermosetting is dimensionally stable to the extent that the knitted fabric restores the shape after any deformation. The shape of the knitted fabric 11 after the thermosetting preferably corresponds to the shape of the surface 10o of the carrier structure 10 onto which the knitted fabric is to be laminated. The medium is discharged again from the knitted fabric 11 by way of discharge ducts 15 in the lower tool half 13, so that a fluid flow of the temperature-controllable medium from the infeed ducts 14 through the cavity into the discharge ducts 15 results.

Figure 4:
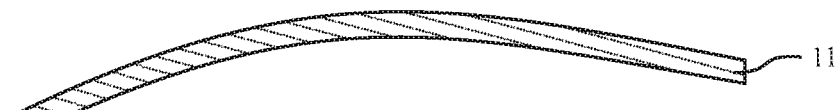
FIG. 4 shows a knitted fabric in the shaped state.

The textile is actively cooled with the aid of cooling nozzles in the upper or the lower tool half and thus remains in the desired shape which is shown in FIG. 4. The cooling medium can be introduced into the cavity by way of the same infeed ducts 14 as the temperature-controllable medium. Alternatively, separate cooling nozzles by way of which the cooling medium is introduced into the cavity in a dedicated manner can also be provided.

Figure 5:
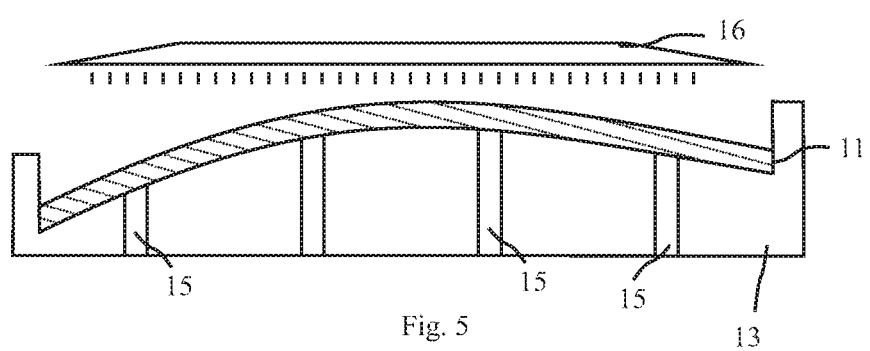
FIG. 5 shows a thermosetting tool according to an alternative embodiment.

Different variants are possible in terms of temperature controlling. FIG. 5 shows the process step of heating in an alternative embodiment of the method. Instead of a hot medium, a radiator array 16 is moved into the open cavity above the 3D knitted fabric 11 and heats the material to the desired temperature by way of radiation heat. The tool then closes, wherein the tool halves 12, 13 therebetween enclose the cavity.

In a further embodiment (not illustrated) of the device for thermosetting, the cavity enclosed between the tool halves 12, 13 can be configured so as to open on the periphery. The medium introduced by way of the infeed ducts 15 can thus be discharged by way of the peripheral gap.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for thermosetting and calibrating a knitted fabric, comprising the steps of:
    disposing the knitted fabric on an effective surface of a first tool half of a calibration tool that has a second tool half and thermosetting the knitted fabric by impinging the knitted fabric via temperature when the knitted fabric is disposed on the effective surface of the first tool half of the calibration tool that has the second tool half;
    after the thermosetting, closing the calibration tool such that a cavity in which the knitted fabric is disposed is generated between the first tool half and the second tool half of the calibration tool and calibrating the knitted fabric between the closed first tool half and second tool half of the calibration tool;
    opening the calibration tool; and
    demolding the knitted fabric from the first tool half.

2. The method according to claim 1, wherein the step of impinging comprises flowing a temperature-controlled medium by the knitted fabric.

3. The method according to claim 2, wherein the temperature-controlled medium is air or steam.

4. The method according to claim 2, wherein the temperature-controlled medium has a temperature in a range from 90° C. to 170° C.

5. The method according to claim 1 further comprising the step of actively cooling the knitted fabric once the knitted fabric has reached a predetermined temperature.

6. The method according to claim 1 further comprising the step of cooling the knitted fabric by introducing a temperature-controlled medium into the cavity via an infeed duct in at least one of the first tool half and the second tool half.

7. A method for producing a knitted fabric, comprising the steps of:
- generating a knitted fabric;
- cleaning the knitted fabric; and
- thermosetting and calibrating the knitted fabric by the method according to claim 1.

8. The method according to claim 7, wherein the knitted fabric is a 3D knitted fabric.

9. The method according to claim 7, wherein the step of cleaning comprises cleaning by washing in a liquid.

10. The method according to claim 7 further comprising the step of introducing a compressible intermediate tier between an effective surface of the first tool half or the second tool half and a surface of the knitted fabric.

11. The method according to claim 7, wherein the knitted fabric includes eyelets knitted into the knitted fabric.

\* \* \* \* \*